United States Patent Office 2,787,647
Patented Apr. 2, 1957

2,787,647

REMOVAL OF ALKALI METALS FROM VISCOUS HYDROCARBON LIQUIDS

Willie W. Crouch and Ted F. Crosnoe, Bartlesville, Okla., assignors to Phillips Petroleum Company, a corporation of Delaware No Drawing. Application June 23, 1949,
Serial No. 100,977

10 Claims. (Cl. 260—666)

This invention relates to the removal of alkali metals from viscous hydrocarbon liquids. In one aspect this invention relates to the treatment of hydrocarbon liquids with acetic acid. In one embodiment, this invention relates to the polymerization of an unsaturated hydrocarbon, particularly a conjugated diolefin such as 1,3-butadiene or an activated vinyl or vinylidene hydrocarbon such as styrene or alphamethyl styrene, in the presence of a finely dispersed alkali metal as a polymerization catalyst and subsequent removal of alkali metal from a resulting polymer-containing material.

Various organic compounds containing an active vinyl or vinylidene group, have been polymerized in the presence of alkali metals, or organic compounds thereof such as alkyl derivatives, to produce polymers of high molecular weight, including viscous, highly unsaturated oils, resins, and elastic rubbery materials. In such a polymerization, an alkali metal is converted to a very fine dispersion suspended in an inert hydrocarbon liquid, a small amount of such a dispersion is then admixed with the monomeric material to be polymerized, and a resulting liquid mixture is maintained at a suitable reaction temperature for a suitable reaction time. At low reaction temperature, i. e. below about 150° F., polymeric products which are separated from resulting reaction effluents are solid resinous or rubbery materials, while at higher reaction temperatures, i. e. above about 160–175° F., polymeric products which are separated from resulting reaction effluents are normally viscous liquids, and frequently have properties making them suitable for use as drying oils or as ingredients of drying oils, etc.

In such polymerizations as just discussed, it is usually necessary to treat a resulting reaction mixture in some manner to convert the alkali metal, and alkali metal organic compounds, present to prevent further catalytic effect of the alkali metal on the product. Alkali metal catalysts are harmful if left in the produce because they promote cross-linking of the polymer with concomitant formation of gel. One of the most common methods employed in the art for the removal of alkali metal catalysts has been the use of water to convert these catalysts to the corresponding hydroxides. However, it is difficult to remove the last traces of these hydroxides from a polymer, a fact that is well known to those skilled in the art (see the Department of Commerce publication entitled "German Plastics Practice" by De Bell and Richardson, p. 436 (1946)). Alkali metal hydroxides left in the polymers are deleterious for many uses of such polymers. For instance, a low molecular weight polymer, which is to be incorporated in low plasticity Buna S type synthetic rubber for improving its processing characteristics, will impart too fast a curing rate to a compound of said rubber if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes and protective surface coatings, and adhesive formulations.

What is desired is a method of removing the alkali metal catalysts from a liquid polymer of a conjugated diene to such an extent that, on analytically burning a sample of the polymer, no ash is found. While treatment of these polymers with fatty acids has been previously disclosed, the method employed merely destroys the free alkali metal, as such, without providing any procedure for eliminating alkali metal compounds from the polymer.

We have now found that the liquid polymerization product of such unsaturated organic compounds produced by reaction in the presence of an alkali metal catalyst, may be treated under carefully controlled conditions with concentrated acetic acid and subsequently processed to provide a high recovery of substantially ash-free liquid polymer.

According to one embodiment of our invention, products of such a polymerization are treated with about 100 to 200 percent of the theoretical amount of substantially anhydrous acetic acid required to react with the alkali metal and organoalkali metal compounds present, i. e. of the stoichiometric amount, allowed to stand for from 48 hours to as long as six months (during this period the alkali metal compounds gradually precipitate from solution, probably as the metal acetate, and settle to the bottom of the vessel in a dense layer), decanted from the precipitated layer and stripped to remove any solvent. A substantially colorless, ash-free polymer results. This treatment, including reaction, settling, and separation, can be carried out at ordinary atmospheric temperatures, usually within a range of about 60 to about 110° F.

An object of this invention is to remove finely dispersed alkali metal from a hydrocarbon liquid.

Another object of this invention is to remove alkali metal alkyls, and similar highly reactive compounds of alkali metals, from inert liquids.

Still another object of our invention is to polymerize a monomeric material comprising an unsaturated organic compound containing an active vinyl or vinylidene group in the presence of a catalytically active form of an alkali metal, and subsequently to recover a resulting polymeric material free from said alkali metal and compounds thereof.

Other objects and advantages of our invention will become apparent, to one skilled in the art, from the accompanying disclosure and discussion.

It is an important feature of our invention that a final product which is free from alkali metals, and compounds thereof, can be obtained only by conducting the treatment with acetic acid under carefully controlled conditions and within certain critical limits for these treatment conditions. If the conditions set forth are not rather closely adhered to when treating the alkali metal-containing liquid with acetic acid, the desired results cannot be obtained, as is illustrated by examples presented hereinafter. For instance, if the second step is too short or is eliminated the final product will not be ash-free and will gradually become clouded with a fine precipitate on standing. On the other hand if a large excess of acetic acid, say three to five fold of theoretical, is added in step one all the alkali metal and alkali metal compounds will precipitate. However, the difficulty is that the precipitate in this case is an extremely flocculent and gelatinous mass which will settle from the polymer solution only partially. Consequently, this lower layer contains a large proportion of the product and separation of the two layers as in step three of the invention results in high losses of the product.

Our invention can be used to remove an alkali metal from any liquid which is inert with respect to acetic acid, under the conditions of treatment. It has particular application to hydrocarbon solutions of polymers produced by the catalytic action of an alkali metal upon monomeric materials such as hereinbefore discussed. Our invention applies particularly to treating hydrocarbon solutions of polymers made by polymerization in solution of conjugated diolefins such as 1,3-butadiene, isoprene or 2,3-dimethyl-1,3-butadiene, either alone or in admixture with each other and/or with minor proportions of other monomers copolymerizable therewith such as styrene, methyl styrene, vinyl naphthalene and the like.

In specifying that the polymers to which our invention applies are made in the presence of alkali metal catalysts, we have meant not only the alkali metals such as sodium or potassium or lithium, but also organoalkali metal compounds of these metals, such as sodium butyl, sodium triphenyl methyl and the like, and alkali metal hydrides.

Advantages of this invention are illustrated by the following examples. The reactants, and their proportions, and the other specific ingredients of the recipes are presented as being typical and should not be construed to limit the invention unduly.

EXAMPLE I

Part I

A mixture of 3.9 parts by weight n-heptane and 0.013 part by weight sodium dispersed in xylene was charged to a stainless steel, jacketed autoclave equipped with a stirrer. The mixture was heated to a temperature of 185° F., the stirrer was started and 1,3-butadiene was introduced until the pressure reached about 25 pounds per square inch gauge. Thereafter butadiene was added to control the pressure at between 15 and 22 pounds per square inch gauge. The temperature was held at 185 to 195° F. throughout the polymerization reaction. The total quantity of butadiene charged was 1.3 parts by weight. After the polymerization was substantially complete the reaction mixture was withdrawn from the reactor for further treatment.

To the reaction mixture containing the catalyst residues was added 120 percent of the theoretical amount of glacial acetic acid required to react with all the sodium and organosodium compounds present. The mixture was then gently stirred for about thirty minutes. After standing quiescent for two days to allow time for complete precipitation and settling, the treated polymer solution was decanted from the dense layer of solids and the solvent was stripped from the polymer. The resulting polymer was a clear, transparent, substantially colorless liquid. Analysis showed that it contained less than 0.001 percent ash, i. e. it was essentially free from inorganic material.

Part II

Another polymerization mixture, prepared substantially as described in Part I of this example, was treated in the same manner as outlined in Part I except that the polymer was allowed to stand quiescent for only two hours before decanting the clear polymer solution from the precipitated solid layer and removing the solvent by stripping. After standing three hours the stripped liquid polymer was clouded with a fine precipitate.

Part III

A further polymerization mixture, prepared substantially as described in Part I of this example, was treated in the same manner as outlined in Part I except that 400 percent of the amount of glacial acetic acid required to react with all the sodium and organosodium compounds present was employed. The precipitate formed was extremely flocculent and after standing for two days the lower layer of the solution containing the solids comprised over 25 percent of the volume of the solution. The clear top portion was decanted and stripped. The resultant polymer was satisfactory, but only about 70 percent of the polymer produced in the polymerization was recovered.

EXAMPLE II

A polymerization mixture containing polybutadiene dissolved in n-heptane and sodium catalyst residues and prepared in a manner similar to the mixture described in Example I was allowed to stand quiescent for about 30 minutes while the sodium metal settled to the bottom of the vessel. The polymer solution containing the colored organosodium compounds was then decanted from the sodium. A sample of the solution was titrated with glacial acetic acid until the color imparted by the organosodium compounds had disappeared. The decanted polymer solution was then treated with 110 percent of the amount of glacial acetic acid required to react with all the sodium residues present. The mixture was agitated for about 30 minutes and allowed to stand for two days, the polymer solution decanted from the dense layer of solids and the solvent removed by stripping. The resulting polymer was a clear, transparent, substantially colorless liquid which contained no detectable amount of ash.

EXAMPLE III

The procedure of Example II was repeated except that 150 percent of the theoretical amount of glacial acetic acid required to react with all the sodium residues present was employed. The resulting polymer was again a clear, transparent, substantially colorless liquid. Analysis showed that no detectable amount of ash was present in the polymer.

As will be evident to those skilled in the art, various modifications of this invention can be made, or followed in the light of the foregoing disclosure and discussion, without departing from the spirit or scope of the disclosure or from the scope of the claims.

We claim:

1. An improved process for removing alkali metal from a liquid hydrocarbon containing same and inert with respect to acetic acid under conditions of the said process, which comprises intimately admixing with said liquid, acetic acid in an amount between 100 and 200 per cent of that stoichiometrically equivalent to said alkali metal, settling resulting reaction products from said liquid, and separating hydrocarbon liquid freed from alkali-metal, from said resulting reaction products.

2. An improved process for removing alkali metal from a hydrocarbon solution of a polymer product of alkali metal catalyzed polymerization of a monomeric material comprising a diene, which comprises admixing glacial acetic acid with said solution in an amount between 100 and 200 percent of that stoichiometrically equivalent to said alkali metal, at a temperature between 60 and 110° F., maintaining the resulting admixture quiescent for a period of at least 48 hours, and recovering a resulting alkali metal-free polymer.

3. An improved process for removing finely divided sodium from a hydrocarbon solution of a polymer product of sodium catalyzed polymerization of a monomeric material comprising a diene, which comprises intimately admixing with said solution, glacial acetic acid in an amount between 100 and 200 of that stoichiometrically equivalent to said sodium, at a temperature between 60 and 110° F., maintaining the resulting admixture quiescent for a period of at least 48 hours, whereby reaction products of said sodium and acetic acid settle from said admixture, and recovering a resulting sodium-free polymer.

4. In a process for the treatment of a liquid co-polymer produced by solution polymerization of 1,3-butadiene and a styrene in the presence of metallic sodium as the catalyst and in which a resulting liquid polymer is obtained which contains metallic sodium as an impurity, the improvement which comprises treating said liquid polymer with an excess of glacial acetic acid to convert all the sodium into a salt which may be separated from the liquid.

5. The process of claim 7 wherein the said amount of acetic acid is 100–200 percent of said stoichiometric amount of alkali metal.

6. In a process for the treatment of a liquid polymer produced by solution polymerization of a monomeric material comprising 1,3-butadiene in the presence of metallic sodium as the catalyst and in which a resulting liquid polymer is obtained which contains sodium as an impurity, the improvement which comprises treating said liquid polymer with an excess of substantially anhydrous acetic acid to convert the sodium into a salt which may be separated from the liquid.

7. An improved process for removing alkali metal from a liquid comprising a polymer product of alkali metal catalyzed polymerization of a monomeric material comprising a diene, which comprises admixing with said liquid, concentrated acetic acid in an amount in excess of that stoichiometrically equivalent to said alkali metal, settling resulting reaction product from said liquid, and recovering a resulting liquid freed from alkali metal.

8. An improved process for removing sodium metal from a solution of a viscous polymer of 1,3-butadiene in an inert hydrocarbon solvent which has been produced therein in the presence of a sodium metal polymerization catalyst, which comprises intimately admixing with said solution glacial acetic acid in an amount between 100 and 200 percent of that stoichiometrically equivalent to said sodium metal, at a temperature between 60 and 110° F., settling resulting reaction products from said solution by maintaining the resulting acetic acid polymer admixture in a quiescent state for a period of at least 48 hours, and recovering a resulting ash free butadiene polymer from said solution.

9. In a process for polymerizing a conjugated diolefin while dissolved in an inert hydrocarbon-liquid in the presence of a finely dispersed alkali metal polymerization catalyst, and recovering a resulting polymeric material containing alkali metal impurities, the improvement which comprises admixing with a resulting hydrocarbon solution of said polymer which is contaminated with said alkali metal impurities, glacial acetic acid in an amount between 100 and 200 percent of that stoichiometrically equivalent to said alkali metal, at a temperature between 60 and 110° F., maintaining a resulting admixture quiescent for a period of at least 48 hours, and recovering a resulting alkali metal-free solution.

10. In a process for polymerizing 1,3-butadiene while dissolved in an inert hydrocarbon-liquid in the presence of a finely dispersed sodium polymerization catalyst, and recovering a resulting polymeric material contaminated with sodium impurities, the improvement which comprises admixing with a resulting hydrocarbon solution of said polymer which is contaminated with said sodium impurities, glacial acetic acid in an amount between 100 and 200 percent of that stoichiometrically equivalent to said sodium, at a temperature between 60 and 110° F., maintaining a resulting admixture quiescent for a period of at least 48 hours, whereby reaction products of sodium and acetic acid settled from said admixture, and recovering a resulting sodium-free solution.

References Cited in the file of this patent

UNITED STATES PATENTS

| 2,209,746 | Ebert et al. | July 30, 1940 |
| 2,458,378 | Herbolsheimer | Jan. 4, 1949 |

FOREIGN PATENTS

| 537,701 | Great Britain | July 3, 1941 |

---

UNITED STATES PATENT OFFICE

CERTIFICATE OF CORRECTION

Patent No. 2,787,647            April 2, 1957

Willie W. Crouch et al.

It is hereby certified that error appears in the printed specification of the above numbered patent requiring correction and that the said Letters Patent should read as corrected below.

Column 1, line 51, for "produce" read -- product --; column 4, line 72, before "styrene" strike out "a".

Signed and sealed this 25th day of June 1957.

(SEAL)
Attest:

KARL H. AXLINE
Attesting Officer

ROBERT C. WATSON
Commissioner of Patents an excess of glacial acetic acid to convert all the sodium into a salt which may be separated from the liquid.

5. The process of claim 7 wherein the said amount of acetic acid is 100–200 percent of said stoichiometric amount of alkali metal.

6. In a process for the treatment of a liquid polymer produced by solution polymerization of a monomeric material comprising 1,3-butadiene in the presence of metallic sodium as the catalyst and in which a resulting liquid polymer is obtained which contains sodium as an impurity, the improvement which comprises treating said liquid polymer with an excess of substantially anhydrous acetic acid to convert the sodium into a salt which may be separated from the liquid.

7. An improved process for removing alkali metal from a liquid comprising a polymer product of alkali metal catalyzed polymerization of a monomeric material comprising a diene, which comprises admixing with said liquid, concentrated acetic acid in an amount in excess of that stoichiometrically equivalent to said alkali metal, settling resulting reaction product from said liquid, and recovering a resulting liquid freed from alkali metal.

8. An improved process for removing sodium metal from a solution of a viscous polymer of 1,3-butadiene in an inert hydrocarbon solvent which has been produced therein in the presence of a sodium metal polymerization catalyst, which comprises intimately admixing with said solution glacial acetic acid in an amount between 100 and 200 percent of that stoichiometrically equivalent to said sodium metal, at a temperature between 60 and 110° F., settling resulting reaction products from said solution by maintaining the resulting acetic acid polymer admixture in a quiescent state for a period of at least 48 hours, and recovering a resulting ash free butadiene polymer from said solution.

9. In a process for polymerizing a conjugated diolefin while dissolved in an inert hydrocarbon-liquid in the presence of a finely dispersed alkali metal polymerization catalyst, and recovering a resulting polymeric material containing alkali metal impurities, the improvement which comprises admixing with a resulting hydrocarbon solution of said polymer which is contaminated with said alkali metal impurities, glacial acetic acid in an amount between 100 and 200 percent of that stoichiometrically equivalent to said alkali metal, at a temperature between 60 and 110° F., maintaining a resulting admixture quiescent for a period of at least 48 hours, and recovering a resulting alkali metal-free solution.

10. In a process for polymerizing 1,3-butadiene while dissolved in an inert hydrocarbon-liquid in the presence of a finely dispersed sodium polymerization catalyst, and recovering a resulting polymeric material contaminated with sodium impurities, the improvement which comprises admixing with a resulting hydrocarbon solution of said polymer which is contaminated with said sodium impurities, glacial acetic acid in an amount between 100 and 200 percent of that stoichiometrically equivalent to said sodium, at a temperature between 60 and 110° F., maintaining a resulting admixture quiescent for a period of at least 48 hours, whereby reaction products of sodium and acetic acid settled from said admixture, and recovering a resulting sodium-free solution.

References Cited in the file of this patent

UNITED STATES PATENTS

| 2,209,746 | Ebert et al. | July 30, 1940 |
| 2,458,378 | Herbolsheimer | Jan. 4, 1949 |

FOREIGN PATENTS

| 537,701 | Great Britain | July 3, 1941 |

---

UNITED STATES PATENT OFFICE

CERTIFICATE OF CORRECTION

Patent No. 2,787,647             April 2, 1957

Willie W. Crouch et al.

It is hereby certified that error appears in the printed specification of the above numbered patent requiring correction and that the said Letters Patent should read as corrected below.

Column 1, line 51, for "produce" read -- product --; column 4, line 72, before "styrene" strike out "a".

Signed and sealed this 25th day of June 1957.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,787,647 April 2, 1957

Willie W. Crouch et al.

It is hereby certified that error appears in the printed specification of the above numbered patent requiring correction and that the said Letters Patent should read as corrected below.

Column 1, line 51, for "produce" read -- product --; column 4, line 72, before "styrene" strike out "a".

Signed and sealed this 25th day of June 1957.

(SEAL)
Attest:

KARL H. AXLINE
Attesting Officer

ROBERT C. WATSON
Commissioner of Patents